United States Patent [19]

Roy et al.

[11] Patent Number: 4,723,841
[45] Date of Patent: Feb. 9, 1988

[54] VARIABLE TRANSMISSION OUTPUT COUPLER AND DEVIATIONLESS TUNER FOR TUNABLE LASERS

[75] Inventors: Rajarshi Roy; Anthony W. Yu, both of Atlanta, Ga.

[73] Assignee: Georgia Tech Research Corporation, Atlanta, Ga.

[21] Appl. No.: 694,505

[22] Filed: Jan. 24, 1985

[51] Int. Cl.$^4$ .............. G02B 26/08; G02B 7/18; H01S 3/08; H01S 3/10
[52] U.S. Cl. .................. 350/359; 350/173; 350/286; 350/287; 350/485; 372/20; 372/100; 372/108
[58] Field of Search .............. 372/20, 54, 100, 107, 372/108; 350/287, 359, 363, 173, 394, 485, 286

[56] References Cited

U.S. PATENT DOCUMENTS

| | | | |
|---|---|---|---|
| 3,156,825 | 11/1964 | Lines | 350/485 |
| 3,338,656 | 8/1967 | Astheimer | 350/485 |
| 3,369,120 | 2/1968 | Falbel | 350/485 |
| 3,711,791 | 1/1973 | Erickson | 372/100 |
| 4,097,818 | 6/1978 | Manoukian et al. | 350/287 |
| 4,278,324 | 7/1981 | Zipfel | 372/107 |
| 4,322,979 | 4/1982 | Fromm | 350/485 |

OTHER PUBLICATIONS

Catalogue entitled Optics for Research-Precision Optical Components, by Optics for Research, Inc., Copyright 1983, printed 6M 5/84, pps. Cover, 5, 25 and 31.
Selleck, R. R., et al, "Switches and Modulators Employing Frustrated Total Internal Reflection", Second International Conference and Winter School on Submillimeter Waves and Their Applications, San Juan, Puerto Rico, 6-11 Dec. 1976, pp. 49-50.
Partington, J. R., *An Advanced Treatise on Physical Chemistry*, vol. four: *Physico-Chemical Optics*, London: Longmans, 1953, pp. 104-107.
Steele, E. L., et al, "A Laser Output Coupler Using Frustrated Total Internal Reflection", *Applied Optics*, vol. 5, No. 1, Jan. 66, pp. 5-8.
Leep, W. R., "Variable Beam Attenuator for 10.6 $\mu$m", *Review of Scientific Instruments*, vol. 47, No. 5 (5/76), pp. 553-555.

*Primary Examiner*—John K. Corbin
*Assistant Examiner*—D. Edmondson
*Attorney, Agent, or Firm*—Newton, Hopkins & Ormsby

[57] ABSTRACT

A variable transmission output coupler and deviationless tuner forms a part of a tunable laser cavity. The device uses frustrated total internal reflection to provide variable output coupling and laser tunability simultaneously. Two Pellin-Broca prisms are pressed against each other by a variable spring pressure mechanism. An adjustable screw regulates the variable force, controlling the thickness of an air film between two prism faces. The Pellin-Broca prisms enable tuning the laser without angular deviation of the output beam. All beams enter and exit at Brewster's Angle, minimizing losses. No coatings are used on the optical elements, reducing the possibility of damage at high operating power of the laser. The coupler may be used in pulsed as well as continuous wave lasers.

6 Claims, 4 Drawing Figures

VARIABLE TRANSMISSION OUTPUT COUPLER AND DEVIATIONLESS TUNER FOR TUNABLE LASERS

BACKGROUND OF THE INVENTION

The present invention was made during the designing of a ring-dye laser system for spectroscopic use. In accordance with the main objectives of the invention, an optical output coupler for lasers provides variable output coupling and simultaneous tunability without angular deviation, with all laser beams at Brewster's Angle. The device can be used with pulsed or continuous wave lasers.

No known variable output coupling devices with all the qualities described above exist in the prior art. Output coupling mirrors do not provide variable coupling. Birefringent tuners provide tuning without providing output coupling. Other prism methods provide tuning but not output coupling. Mirrors require changing when going from one wavelength to another. Dielectric coatings on optical components are susceptible to damage at high powers. Birefringent tuners are extremely expensive with the above-stated limitation.

The device in accordance with the present invention possesses, among others, the following advantages:

(1) The transmission coefficient can be changed in a controlled manner to obtain the maximum laser output or desired light flux within a cavity.

(2) There is negligible angular deviation of the output beam as the laser is tuned in wavelength.

3. Losses through undesirable reflections, scattering and absorption are minimized.

(4) The coupler can be used over the entire wavelength range for which the glass (or other material) used for the prisms has a low absorption.

(5) The possibility for damage is minimized even at high powers since no dielectric coatings are employed.

The novelty of the present invention over the prior art is believed to reside in the use of two Pellin-Broca prisms for obtaining variable output coupling from the laser systems. Novelty also is present in that the device achieves variable transmission through an output coupler, while simultaneously providing tuning capability for a tunable laser system without producing any angular deviation of the output, or losses due to unwanted reflections.

Other features and advantages of the invention will become apparent to those skilled in the art during the course of the following detailed description.

BRIEF DESCRIPTION OF THE DRAWING FIGURES

DETAILED DESCRIPTION

Figure 1:
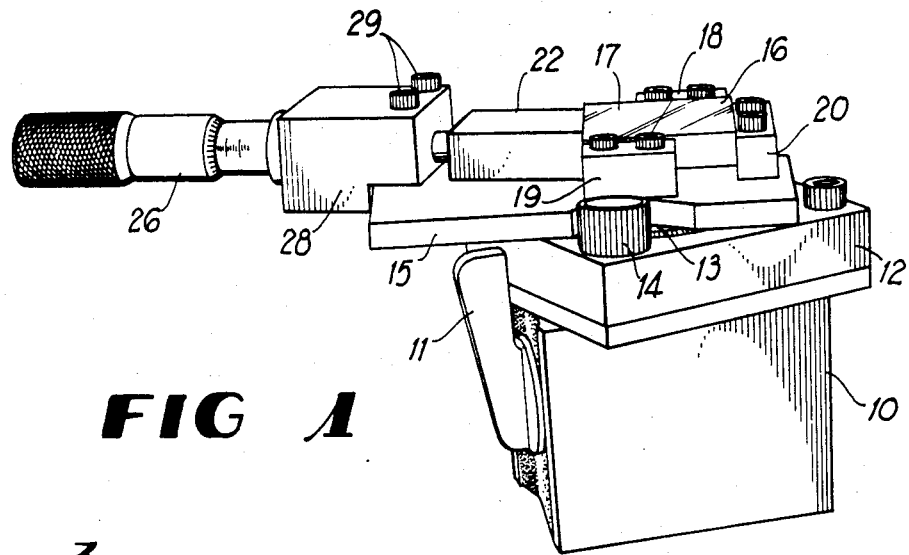
FIG. 1 is a perspective view of a variable transmission output coupler and deviationless tuner for tunable lasers according to the present invention.

Referring to the drawings in detail wherein like numerals designate like parts throughout the same, the numeral 10 designates a conventional permanent magnet holder or base member having an activate/deactivate manual lever 11. A base plate 12 for the device is formed of material which can be magnetically attracted to the holder 10 at desired times. Upon or within the base plate 12 is a rotational stage 13 for the device which can be finely adjusted circumferentially through a limited range by a manual adjusting knob 14, geared or otherwise operatively coupled with the stage 13.

Mounted on the rotational stage 13 to turn therewith is a flat carriage plate 15 on which the primary optical components of the device are held. More particularly, a pair of opposing Pellin-Broca prisms 16 and 17 rest on the carriage plate 15 and are held in opposing guided relationship by a system of locator blocks 18, 19 and 20. The two locator blocks 18 and 19 are parallel and are in sliding engagement with the end faces of the two prisms 16 and 17. The third block 20 disposed at right angles to the blocks 18 and 19 solidly engages the adjacent side edge of the Pellin-Broca prism 16. The three locator blocks 18, 19 and 20 are securely anchored to the carriage plate 15 by pairs of screws 21.

Variable pressure is exerted against the side face of the prism 17 which is remote from and parallel to the locator block 20 by a compression block 22 immediately above and on the carriage plate 15. The compression block 22 contains a cavity 23 which contains a compression spring 24, engaged at one end by a micrometer shaft 25. The shaft 25 forms a part of a conventional manually operated micrometer drive 26 which is held through screw-threaded engagement as at 27 within a support block 28, fixedly secured by screws 29 to the carriage plate 15 at one end of the latter. By this described arrangement, variable pressure through the spring 24 and compression block 22 is exerted on the prism 17, thereby changing the thickness of a gap or air film 30a (FIG. 2) located between the two opposing flat faces 30 of the Pellin-Broca prisms.

The amount of output coupling desired is achieved by adjusting the pressure exerted by the compression block 22 on the prism 17. Optimum coupling can be selected in this manner. The invention utilizes frustrated total internal reflection to provide variable output coupling. The adjustable pressure exerted by the compression block 22 on the prism 17 controls the thickness of the gap or air film 30a between the two opposing faces 30 of the prisms 16 and 17.

This gap is so small that it is represented by a single line in the figures. The Pellin-Broca prisms allow tuning the laser without angular deviation of the output beam. All beams enter and exit the device at Brewster's Angle, minimizing losses. The possibility of damage is minimized even at high powers since no dielectric coatings are employed on the prisms.

By rotating the stage 13 carrying the prism assembly around the axis 31, negligible deviation of the output beam over the entire tuning range of the laser is assured.

Preferably, the Pellin-Broca prisms 16 and 17 are SF-11 (dense flint) for obtaining high dispersion. Other types of glass could be used in some cases, such as BK7 glass, part number ABD 10 (Optics for Research).

Figure 4:
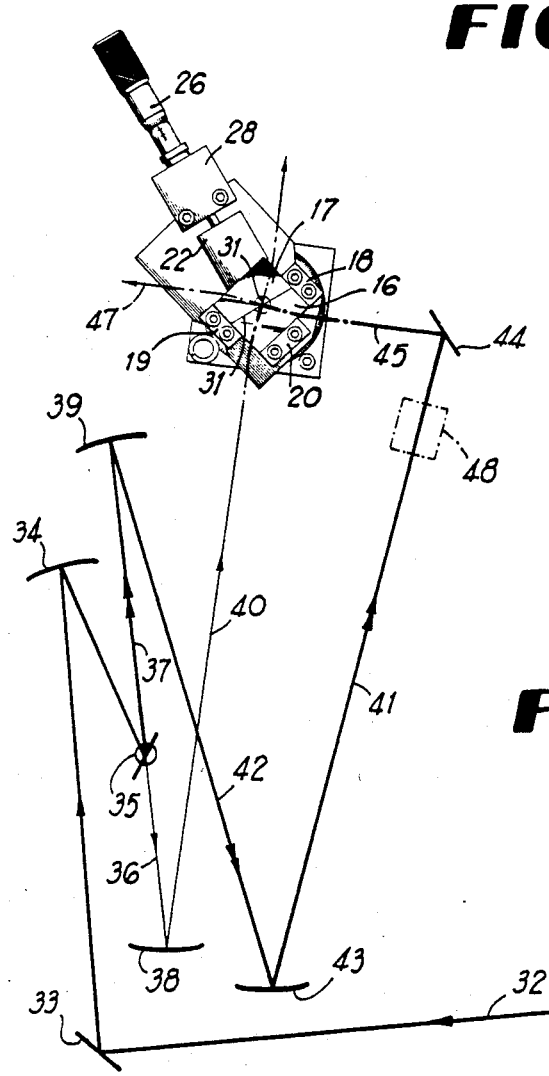
FIG. 4 is a partly schematic plan view of the invention showing its use as a part of a tunable laser cavity within a ring-dye laser system.

Referring to FIG. 4, a pump laser beam 32 is reflected by a flat mirror 33 onto a concave mirror 34 which reflects the laser beam into a dye jet stream 35. The emitted laser beam comprises two coaxial oppositely directed beam segments 36 and 37, which are reflected by additional concave mirrors 38 and 39 to form one entrance beam 40 and another beam 42. The beam 42 is reflected by another mirror 43 to form a beam 41, reflected by a flat mirror 44 to produce a second entrance beam 45.

Figure 2:
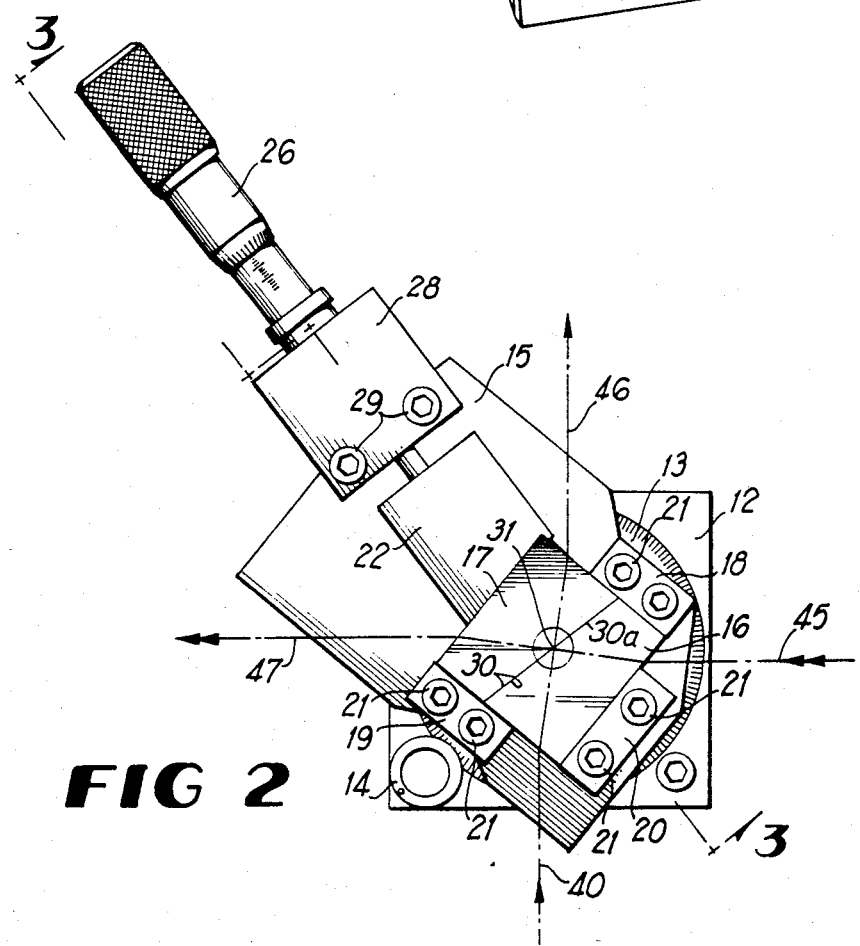
FIG. 2 is a plan view of the device in FIG. 1.
Figure 3:
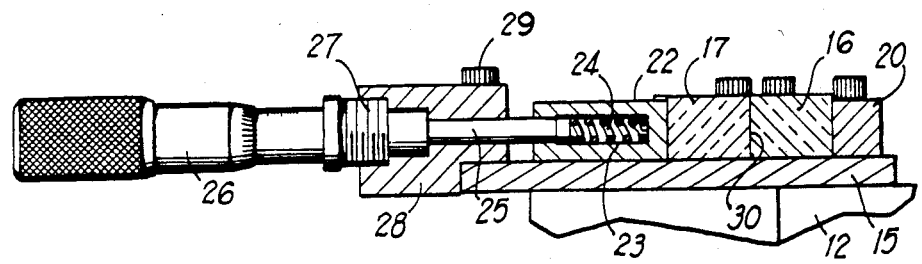
FIG. 3 is a fragmentary vertical section taken on line 3—3 of FIG. 2.

The two entrance beams 40 and 45 are shown in FIG. 2. Both beams enter the prism 16 at Brewster's Angle and are refracted as shown graphically in FIG. 2 and exit the prism 17, again at Brewster's Angle, as two refracted exit beams 46 and 47. It can be noted in FIG. 2 that the opaque elements 18, 19, 20 and 22 are spaced in such a manner as not to interfere with the entering and exiting of the laser beams into and from the Pellin-Broca prisms.

A Faraday rotator and compensator 48, FIG. 4, can be interposed in the beam 41 to provide unidirectional operation of the laser. Only one output beam will then be obtained from the laser.

Alternative constructions of the device are possible. For example, use of a piezo-electric transducer, together with a micrometer head, to obtain fine and coarse adjustments of pressure is possible. This system can be used as a modulator for the laser, or as a laser intensity stabilizer, in conjunction with a feedback loop containing a differential amplifier. Furthermore, the use of a thin film spacer between the prism faces 30 will change the output characteristics of the device according to the properties of the film spacer.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A variable transmission output coupler and deviationless tuner for tunable lasers comprising a supporting base, a rotationally adjustable stage on the supporting base, a carriage member on the stage to turn therewith, spaced locator blocks on the carriage plate including a pair of parallel locator blocks and one locator block disposed at right angles to said pair, two Pellin-Broca prisms on the carriage plate within the space defined by said locator blocks, said prisms being separated by a gap, a compression block on the carriage plate in abutment with one Pellin-Broca prism and being operable to change the width of said gap between said two prisms, and variable spring measure means acting on said compression block in one direction and urging it yieldingly toward said one prism.

2. A variable transmission output coupler and deviationless tuner for tunable lasers as defined in claim 1, said variable spring pressure means comprising a compression spring acting on said compression block, and a micrometer drive on the carriage plate including a micrometer shaft engaging said spring to vary the tension thereof.

3. A variable transmission output coupler and deviationless tuner for tunable lasers as defined in claim 2, said micrometer drive further comprising a micrometer head including said shaft, and a mounting block for the micrometer head, said mounting block being fixedly attached to the carriage plate.

4. A variable transmission output coupler and deviationless tuner for tunable lasers comprising a supporting base means including a stage adapted to rotate on one axis of rotation, support and precision locator means for a pair of abutting Pellin-Broca prisms on the stage adapted to rotate therewith, and precision manually operable means attached to said stage to apply a variable yielding pressure against one Pellin-Broca prism in a direction forcing it towards the other prism, said prisms having opposing faces, the spacing of said locator means and the means to apply variable yielding pressure against one Pellin-Broca prism being such that two unobstructed areas are provided on two perpendicular faces of each prism enabling two laser beams to enter one prism and to exit the other prism.

5. A variable transmission output coupler and deviationless tuner for tunable lasers as defined in claim 4, and said precision manually operable means comprising a spring-urged compression block engaging and acting on one prism, and a precision adjustable device including an axially movable shaft connected with the spring-urged compression block to vary the tension of the spring acting on the compression block.

6. A laser apparatus, comprising:
   (a) A variable transmission output coupler and deviationless tuner for tunable lasers including a supporting base, a rotationally adjustable stage on the supporting base, a carriage member on the stage to turn therewith, spaced locator blocks on the carriage plate including a pair of parallel locator blocks and one locator block disposed at right angles to said pair, two Pellin-Broca prisms on the carriage plate within the space defined by the locator blocks, said prisms being separated by a gap, a compression block on the carriage plate in abutment with a first said Pellin-Broca prism and being operable to change the width of said gap between said two prisms and variable spring pressure means acting on said compression block in one direction and urging it yieldingly toward said first prism; and
   (b) a laser beam reflecting system operable to form two entrance beams which are directed through two perpendicular faces of the second said Pellin-Broca prism in two unobstructed regions on said second prism between the spaced locator blocks, said beams being refracted and exiting through two perpendicular faces of the first said Pellin-Broca prism at two unobstructed regions thereof between said pair of parallel locator blocks and said compression block.

* * * * *